(12) United States Patent
Haas

(10) Patent No.: US 9,302,360 B2
(45) Date of Patent: Apr. 5, 2016

(54) METHOD FOR OPERATING A MACHINE TOOL AND MACHINE TOOL

(71) Applicant: Liebherr-Verzahntechnik GmbH, Kempten (DE)

(72) Inventor: Gebhard Haas, Altusried (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 262 days.

(21) Appl. No.: 13/756,244

(22) Filed: Jan. 31, 2013

(65) Prior Publication Data

US 2013/0202377 A1  Aug. 8, 2013

(30) Foreign Application Priority Data

Feb. 3, 2012  (DE) .......................... 10 2012 002 125

(51) Int. Cl.
| | |
|---|---|
| *B24B 51/00* | (2006.01) |
| *B23Q 7/00* | (2006.01) |
| *B23F 23/04* | (2006.01) |
| *B23F 23/06* | (2006.01) |
| *B23F 17/00* | (2006.01) |
| *B23Q 3/06* | (2006.01) |
| *B23Q 17/00* | (2006.01) |

(52) U.S. Cl.
CPC ................ *B23Q 7/00* (2013.01); *B23F 17/006* (2013.01); *B23F 23/04* (2013.01); *B23F 23/06* (2013.01); *B23Q 3/06* (2013.01); *B23Q 17/005* (2013.01); *Y10T 409/100159* (2015.01); *Y10T 409/100795* (2015.01); *Y10T 409/109699* (2015.01)

(58) Field of Classification Search
CPC ........... B23F 23/06; B23F 23/04; B23Q 7/00; B24B 51/00
USPC ..................... 451/5, 8, 9, 10, 47; 409/2, 62, 6
See application file for complete search history.

(56) References Cited

U.S. PATENT DOCUMENTS

| | | | | |
|---|---|---|---|---|
| 3,200,711 | A  * | 8/1965 | Rogg .............................. | 409/62 |
| 4,422,265 | A  * | 12/1983 | Branston ....................... | 451/147 |
| 6,565,418 | B1 * | 5/2003 | Feisel ............................ | 451/10 |
| 8,527,085 | B2 * | 9/2013 | Breith et al. .................. | 700/164 |
| 8,979,616 | B2 * | 3/2015 | Katsuma et al. .............. | 451/253 |

(Continued)

FOREIGN PATENT DOCUMENTS

| | | |
|---|---|---|
| DE | 2458958 A1 | 6/1976 |
| DE | 265349 A1 | 3/1989 |

(Continued)

OTHER PUBLICATIONS

German Patent and Trade Mark Office, Search Report of DE102012002125.9, Nov. 29, 2012, 13 pages.

*Primary Examiner* — Robert Rose
(74) *Attorney, Agent, or Firm* — Alleman Hall McCoy Russell & Tuttle LLP

(57) ABSTRACT

The present disclosure relates to a method for operating a machine tool, in particular a gear cutting machine, with at least two machine tables, with at least one common counter-support and with at least two counter-bracket arms, wherein the clamping forces are controlled and/or regulated at the respective position in dependence on the current process and in dependence on the process forces necessary according to the current process. Furthermore, the present disclosure relates to a machine tool, in particular a gear cutting machine.

15 Claims, 3 Drawing Sheets

(56) References Cited

U.S. PATENT DOCUMENTS

2001/0031606 A1* 10/2001 Schafer et al. .................... 451/5
2008/0280543 A1* 11/2008 Weiss et al. ..................... 451/72
2013/0045667 A1* 2/2013 Katsuma et al. ............. 451/253

FOREIGN PATENT DOCUMENTS

| EP | 1992439 A1 | 11/2008 |
| EP | 2305409 A1 | 4/2011 |
| WO | 0035621 A1 | 6/2000 |

* cited by examiner

A method for operating a machine tool, with at least two machine tables, with at least one common counter-support and with at least two counter-bracket arms, wherein a clamping force acting on a clamped workpiece and/or a workpiece to be clamped are controlled and/or regulated at a respective position in dependence on a current process and in dependence on process forces necessary according to the current process.

Fig. 3

METHOD FOR OPERATING A MACHINE TOOL AND MACHINE TOOL

CROSS REFERENCE TO RELATED APPLICATION

This application claims priority to German Patent Application No. 10 2012 002 125.9, entitled "Method for Operating a Machine Tool and Machine Tool," filed Feb. 3, 2012, which is hereby incorporated by reference in its entirety for all purposes.

TECHNICAL FIELD

The present disclosure relates to a method for operating a machine tool, in particular a gear cutting machine, and to a machine tool, in particular a gear cutting machine.

BACKGROUND AND SUMMARY

Known gear cutting machines 10' have a machine table 50' with an associated counter-support 60' and a counter-bracket arm 30' or spindle sleeve 30' mounted thereon (cf. FIG. 2).

The counter-bracket arm 30' has the function to lower or set down the clamping device upper part 90', which is not shown in detail, on the workpiece 91', but in most cases additionally also clamps the workpiece 91' between the clamping device lower part 92' and the clamping device upper part 90'. This applies both to undulating workpieces and to bore parts.

In addition, in undulating workpieces there is also a guiding and centering function of the countersupport 60', i.e. alignment errors of the counter-bracket arm 30' with respect to the table center of the machine table 50' have a negative effect on the machining result.

In order to minimize the unproductive idle periods for ancillary processes such as loading and unloading workpieces, clamping workpieces and also for the location-oriented positioning of workpieces, it is likewise known to equip gear cutting machines, above all gear grinding machines, with two machine tables. However, since the ancillary processes now take place in parallel with the machining operation, the problem exists that the ancillary processes can have a disadvantageous effect on the machining result due to the mechanical coupling of the corresponding clamping devices for the workpieces, which however is undesirable and should therefore be avoided.

From EP 1 146 983 B1, such gear cutting machine with a double table is known already.

EP 2 305 409 A1 furthermore discloses a method for operating a gear grinding machine with hanging machine tables for loading and unloading the machine.

EP 1 992 439 A1 relates to a gear cutting machine with a counter-support on a round table.

In the aforementioned approaches known from the prior art the problem exists, however, that ancillary processes can have a disadvantageous effect on the machining result, which however is undesirable and should therefore be avoided.

Therefore, it is the object of the present disclosure to develop a method for operating a machine tool as well as a machine tool in an advantageous way, in particular to the effect that ancillary processes in operation of the machine tool have no or no significant effect on the machining result of the machining process.

In accordance with the present disclosure, this object is solved by a method for operating a machine tool with at least two machine tables, with at least one common counter-support and with at least two counter-bracket arms, the clamping forces acting on a clamped workpiece and/or a workpiece to be clamped are controlled and/or regulated at the respective position in dependence on the current process and in dependence on the process forces necessary according to the current process.

Thereby, it can advantageously be prevented that deformation influences from the clamping operation of workpiece clamping have a negative effect on the machining result of the further workpiece just being machined. In particular, it is possible thereby to minimize movements and deformations of the counter-support, which in ancillary processes occur in parallel with the machining of a first workpiece, as is the case for example during the loading and unloading of a second workpiece, and to reduce or prevent their effects on the machining, so that these deformations cannot have a noticeable negative effect.

The machine tool can be a gear cutting machine, in particular a gear cutting machine by which a toothing can be produced on a workpiece, for example by milling and/or slotting and/or grinding. The gear cutting machine may be a gear grinding machine.

The method for operating a machine tool in particular is a method for actuating a counter-bracket/spindle sleeve function in machines with several machine tables, in particular gear cutting machines with one common counter-support, but several counter-bracket arms.

In addition, it can be provided that on loading and/or unloading the machine tool a workpiece is centered and clamped with a clamping force, wherein the clamping force is dimensioned such that it is large enough to keep the workpiece in position for the workpiece positioning process. For example, the clamping force may be greater than a threshold, the threshold set based on the process.

It is also possible that the machine tool has a loading and unloading position, which is a first position of one of the machine tables, and that all ancillary processes carried out at the loading and unloading position are carried out with reduced clamping force, wherein the clamping force may be dimensioned such that it is large enough to keep the workpiece in position at the loading and unloading position.

Furthermore, it is conceivable that before a movement or during a movement of the workpiece from the loading and unloading position into the machining position the clamping force is increased.

In addition, it is conceivable that during a movement of the workpiece from the machining position, which is a second position of one of the machine tables, into the loading and unloading position the clamping force is reduced.

The increase/reduction of the clamping force always can be effected when the workpiece is not being machined; in the extreme case even during a multi-stage machining operation (on the condition of sufficient machining allowance). In the last step, however, in which the workpiece quality is produced, a deformation of the counter-support must definitely be avoided.

Furthermore, the present disclosure relates to a machine tool, in particular a gear cutting machine, is provided with at least two machine tables, with at least one common counter-support, with at least two counter-bracket arms and with at least one control and/or regulating unit, wherein via the control and/or regulating unit the clamping forces acting on a clamped workpiece or a workpiece to be clamped can be controlled and/or regulated at the respective position in dependence on the current process and in dependence on the process forces necessary according to the current process.

It is also possible that the clamping force is directly and/or indirectly controllable by the control and/or regulating unit such that on loading and/or unloading the machine tool a workpiece can be centered and clamped with a clamping force, wherein the clamping force is dimensioned such that it is large enough to keep the workpiece in position for the workpiece positioning process.

It is furthermore conceivable that the machine tool has a loading and unloading position, which is a first position of one of the machine tables, and that the clamping force is directly and/or indirectly controllable by the control and/or regulating unit such that all ancillary processes carried out at the loading and unloading position are carried out with reduced clamping force, wherein the clamping force may be dimensioned such that it is large enough to keep the workpiece in position at the loading and unloading position.

It is also possible that before a movement or during a movement of the workpiece from the loading and unloading position into the machining position the clamping force is increased and/or that before a movement or during a movement of the workpiece from the machining position, which is a second position of one of the machine tables, into the loading and unloading position the clamping force is reduced.

Further details and advantages of the present disclosure will now be explained in detail with reference to an exemplary embodiment illustrated in the drawing.

BRIEF DESCRIPTION OF THE FIGURES

FIG. 1 is drawn to scale, although other relative dimensions may be used.

FIG. 3 shows an example method of operation.

DETAILED DESCRIPTION

Figure 1:
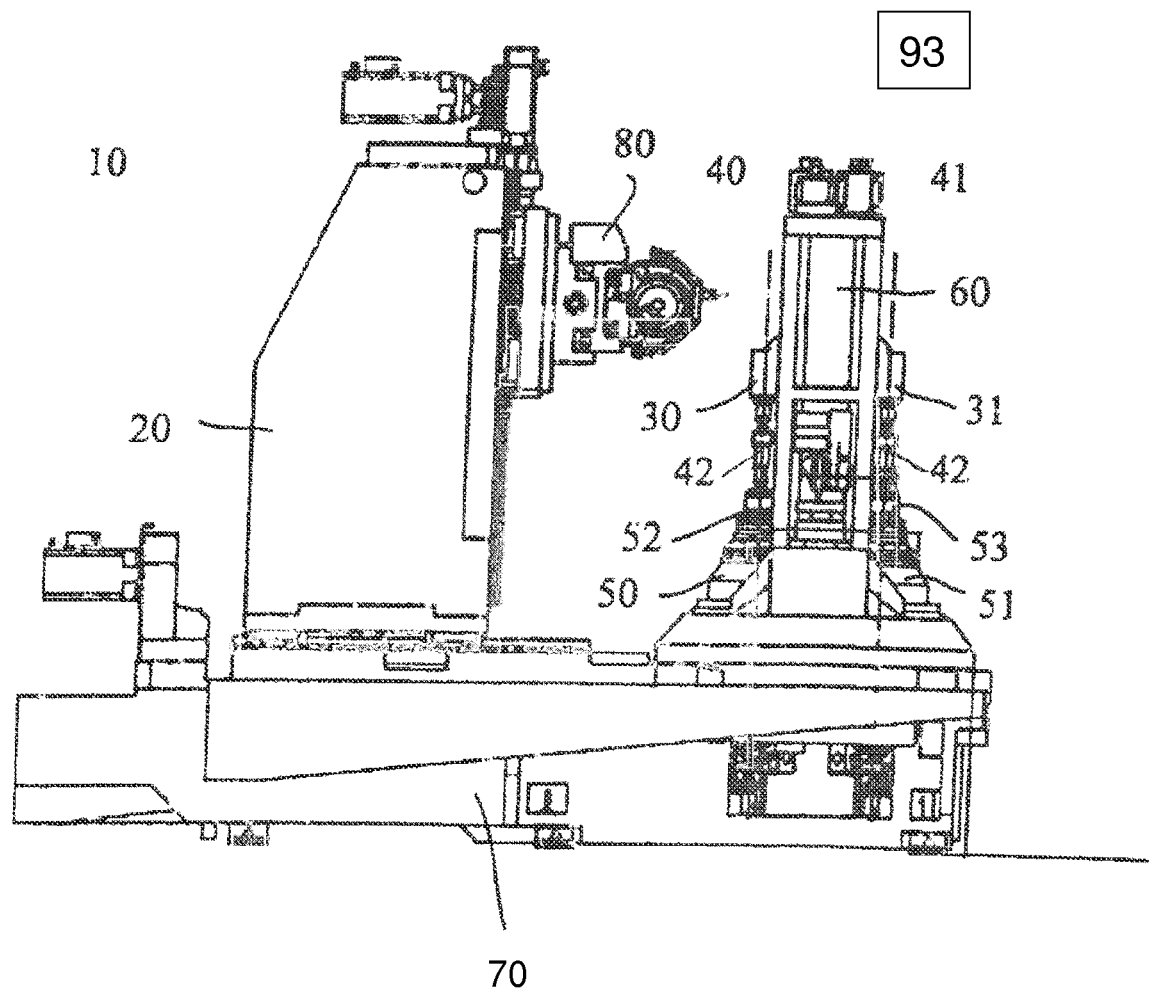
FIG. 1 shows a schematic side view of a machine tool according to the present disclosure.

FIG. 1 shows a schematic side view of a machine tool 10 or gear cutting machine 10 according to the present disclosure. The gear cutting machine 10 is a gear grinding machine 10 with two machine tables 50, 51, so that it is possible to utilize the unproductive idle times for ancillary processes such as loading and unloading the workpiece, clamping the workpiece and also location-oriented positioning of the workpiece.

Thus, these ancillary processes can be carried out during the gear cutting operation at the second machine table, e.g. here the machine table 51, while the first machine table 50 is used for the actual machining of the workpiece.

The workpiece clamped, e.g. on the second machine table 51, then is immediately ready for further machining, after the two machine tables 50, 51 have been exchanged. This of course also applies when swapping the position of the machining head 80 relative to the machine table 50, 51. It is important, however, that the machining position 40 is swapped with the secondary position 41.

On the left of the machine bed 70 a machine column 20 is mounted, which carries the machining head 80. On the right and opposite the machine column 20 the two machine tables 50, 51 are located.

As in the present disclosure the two counter-bracket arms 30, 31 now are mounted on a common counter-support 60, influences from the clamping operation of workpiece clamping can be transmitted to the machining position. Due to the clamping forces or forces which are produced on clamping the workpiece clamping devices 52, 53, small deformations of the counter-support 60 can occur, which can have a negative effect on the machining result.

According to the present disclosure it now is provided to advantageously minimize these influences or even avoid them at all. For this purpose, the workpiece is centered and clamped at the loading and unloading position 41 with a minimum clamping force only. This force is large enough to for example keep the workpiece in position for the workpiece positioning process. This clamping force, however, is not sufficient to absorb forces which act on the workpiece during the machining process. These clamping forces will only be applied at a later point in time.

In a clamping operation according to the present disclosure, all ancillary processes at the loading and unloading position 41, which also is the position for all ancillary processes, are carried out with reduced clamping force. Thus, forces which might lead to a deformation of the counter-support 60 remain low. As soon as the machining process carried out at the front at the machining position 40 is terminated, the clamping forces are reduced there and now a change of the table position of the machine tables 50, 51 takes place. At the same time, the clamping forces are increased at the machine table, which now moves towards the machining position 40.

It thus advantageously becomes possible that the deformations of the counter-support 60 cannot have a disadvantageous effect on the machining process. However, the workpiece nevertheless can reach the machining position 40 completely clamped and the machining process can start immediately, after establishing the rolling coupling.

Figure 2:
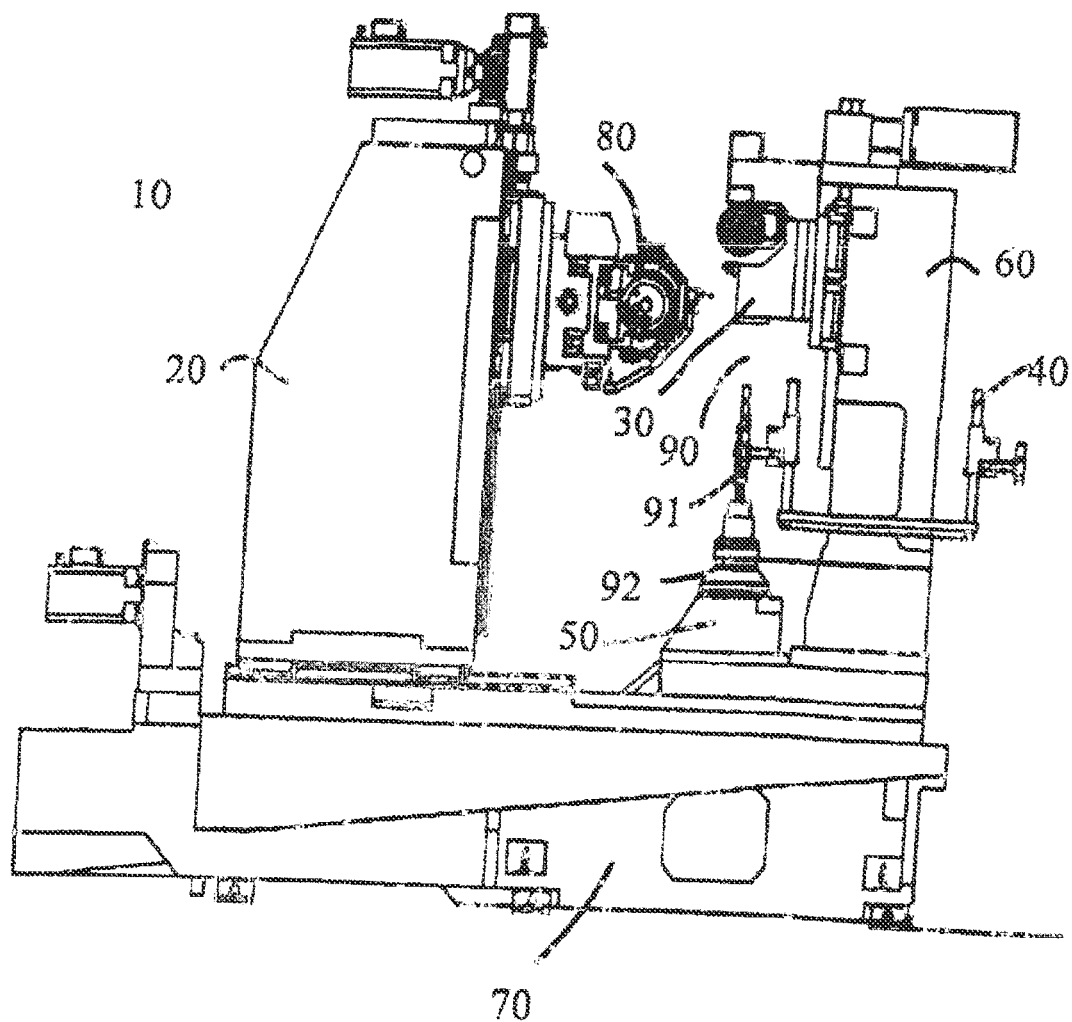
FIG. 2 shows a schematic side view of a known machine tool.

FIG. 2 shows a schematic side view of a known machine tool 10', which is a gear cutting machine 10' and which includes a machine table 50' with an associated counter-support 60' and a counter-bracket arm 30' or a spindle sleeve 30' mounted thereon.

On the left of the machine bed 70' a machine column 20' is mounted, which carries the machining head 80. On the right and opposite the machine column 20', the machine table 50' with the associated counter-support 60' and the counter-bracket 30' or counter-bracket arm 30' mounted thereon as well as the ring loader 40' is located.

By the counter-bracket arm 30' the clamping device upper part 90', which is not shown in detail, can be lowered or set down on the workpiece 91'. In most cases, it is furthermore possible to additionally also clamp the workpiece 91' between the clamping device lower part 92' and the clamping device upper part 90'.

The machine may include a control and/or regulating unit 93, including a processor having memory with non-transitory instructions for carrying out the various actions described herein, including controlling the clamping forces acting on the clamped workpiece at the respective position in dependence on the current process and in dependence on the process forces necessary according to the current process. For example, FIG. 3 shows one example routine that may be carried out by the controller.

The invention claimed is:

1. A method for operating a machine tool, with at least two machine tables, with at least one common counter-support and with at least two counter-bracket arms, wherein a first clamping force provided by a first counter-bracket arm of the at least two counter-bracket arms is applied to a first workpiece at a loading and unloading position, and wherein a second clamping force provided by a second counter-bracket arm of the at least two counter-bracket arms is applied to a second workpiece at a machining position, the second clamping force different than the first clamping force, and where the second and first clamping forces are adjusted at the respective machining and loading and unloading positions in dependence on a current process and in dependence on process forces necessary according to the current process.

2. The method according to claim 1, wherein at the loading and unloading position of the machine tool, the first workpiece or the second workpiece is centered and clamped with the first clamping force, wherein the first clamping force is dimensioned such that it is large enough to keep the workpiece in position for a workpiece positioning process.

3. The method according to claim 2, wherein the loading and unloading position is a first position of one of the at least two machine tables, and all ancillary processes carried out at the loading and unloading position are carried out with reduced clamping force, wherein the reduced clamping force is dimensioned such that it is large enough to keep the workpieces in position at the loading and unloading position.

4. The method according to claim 3, wherein before a movement or during a movement of either the first workpiece or the second workpiece from the loading and unloading position into the machining position, a clamping force applied to the workpiece being moved from the loading and unloading position into the machining position is increased from the first clamping force.

5. The method according to claim 1, wherein before a movement or during a movement of either the first workpiece or the second workpiece from the machining position, which is a second position of one of the machine tables, into the loading and unloading position, a clamping force applied to the workpiece being moved from the machining position to the loading and unloading position is reduced from the second clamping force.

6. A machine tool, comprising:
at least two machine tables, with at least one common counter-support;
at least two counter-bracket arms, the counter-bracket arms and machine tables adjustable between a machining position and a loading and unloading position; and
at least one control unit including memory with instructions for applying a first clamping force to a first workpiece at the loading and unloading position, and applying a second clamping force to a second workpiece at the machining position, where the first clamping force is different than the second clamping force, and where the second and first clamping forces are controlled at the respective machining and loading and unloading positions in dependence on a current process and in dependence on process forces necessary according to the current process.

7. The machine tool according to claim 6, wherein the clamping forces are controllable by the control unit such that on loading the workpieces, the workpieces are centered and clamped with the first clamping force, wherein the first clamping force is dimensioned such that it is large enough to keep the workpieces in position for a workpiece positioning process.

8. The machine tool according to claim 7, wherein the loading and unloading position is a first position of one of the at least two machine tables, and the first clamping force is controllable by the control unit such that all ancillary processes carried out at the loading and unloading position are carried out with reduced clamping force, wherein the reduced clamping force is dimensioned such that it is large enough to keep the workpieces in position at the loading and unloading position.

9. The machine tool according to claim 8, wherein before a movement or during a movement of one of the workpieces from the loading and unloading position into the machining position, the first clamping force is increased.

10. The machine tool according to claim 8, wherein before a movement or during a movement of one of the workpieces from the machining position, which is a second position of one of the machine tables, into the loading and unloading position, the second clamping force is reduced.

11. A method for operating a machine tool with at least two machine tables, at least one common counter-support, and at least two counter-bracket arms, comprising:
while providing a first clamping force to a first workpiece being machined via a first counter-bracket arm of the at least two counter-bracket arms, adjusting a second clamping force provided by a second counter-bracket arm of the at least two counter-bracket arms and acting on a second clamped workpiece in dependence on a current process and in dependence on process forces necessary according to the current process, wherein the machine tool is a gear cutting machine, and wherein an ancillary process occurs on the second clamped workpiece in parallel with machining of the first workpiece, and wherein the second clamping force is different than the first clamping force.

12. The method of claim 11, wherein the ancillary process is a loading and unloading of the second clamped workpiece.

13. The method according to claim 12, wherein during the loading and unloading, the second clamped workpiece is centered and clamped with the second clamping force.

14. The method of claim 1, wherein the first clamping force is less than the second clamping force.

15. The method of claim 11, where the second clamping force is less than the first clamping force.

* * * * *